Dec. 31, 1940.  W. E. SWENSON  2,226,596
POWER PLANT
Filed March 27, 1939  2 Sheets-Sheet 1

Inventor
WILLIAM E. SWENSON
By Carlsen + Hazle
Attorney

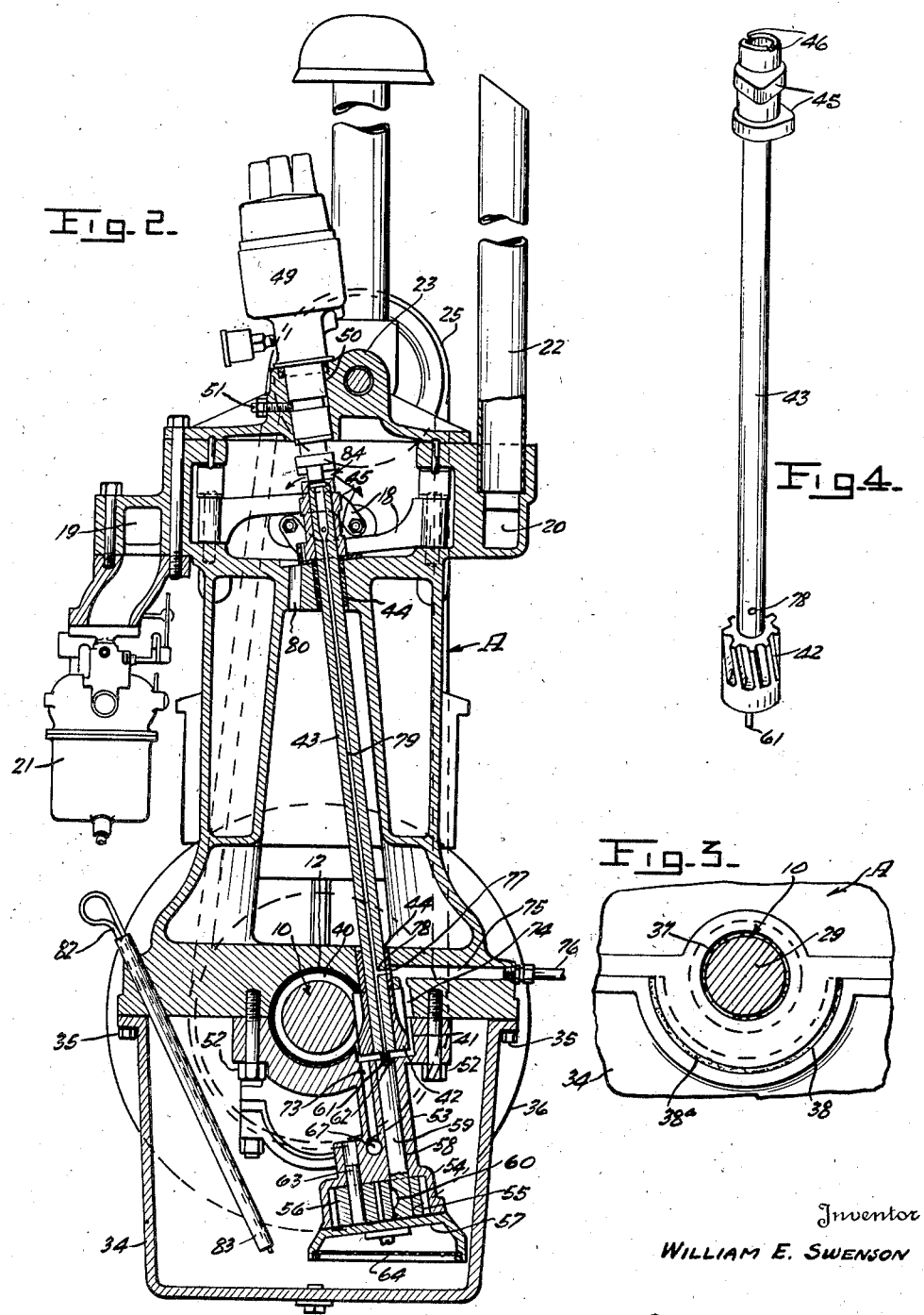

Patented Dec. 31, 1940

2,226,596

UNITED STATES PATENT OFFICE 2,226,596

POWER PLANT

William E. Swenson, Minneapolis, Minn.

Application March 27, 1939, Serial No. 264,427

13 Claims. (Cl. 123—195)

This invention relates to improvements in internal combustion engines, and the primary object is to provide a novel and extremely advantageous assembly and arrangement of certain of the component parts of the engine to the end that a more compact, inexpensive, simple, and easily serviced machine will result.

Another object is to provide particular improvements in the driving means for the oil pump, valve actuating mechanism, and ignition distributor elements of the engine, and which driving means embodies a single shaft directly driven by the crankshaft of the engine and with connections at its end portions to the driven elements set forth.

Another object is to provide, in combination with the driving means aforesaid, a novel and effective oil pump assembly in which the pump housing is formed as a part of one bearing for the engine crankshaft to properly support the pump in the engine assembly and in position for most convenient drive by the driving shaft associated with the said crankshaft.

Another object is to provide in an engine of this kind an assembly wherein only one "running" seal, or seal subject to friction, is required around the crankshaft, thus reducing cost of servicing and repairing in this respect by a very considerable extent.

Still a further object is to provide, in combination with the foregoing, a generally improved lubrication system or arrangement and an improved assembly of the various other parts of the engine, all of which improvements are made possible by, and flow out of, the novel features set forth.

These and other more detailed and specific objects will be disclosed in the course of the following specification, reference being had to the accompanying drawings, in which—

Fig. 2 is a vertical cross section along the line 2—2 in Fig. 1.

Fig. 3 is a fragmentary vertical section taken along the line 3—3 in Fig. 1.

Fig. 4 is a detail perspective view of the driving shaft including the valve actuating cams and the drive gear.

Figure 1:
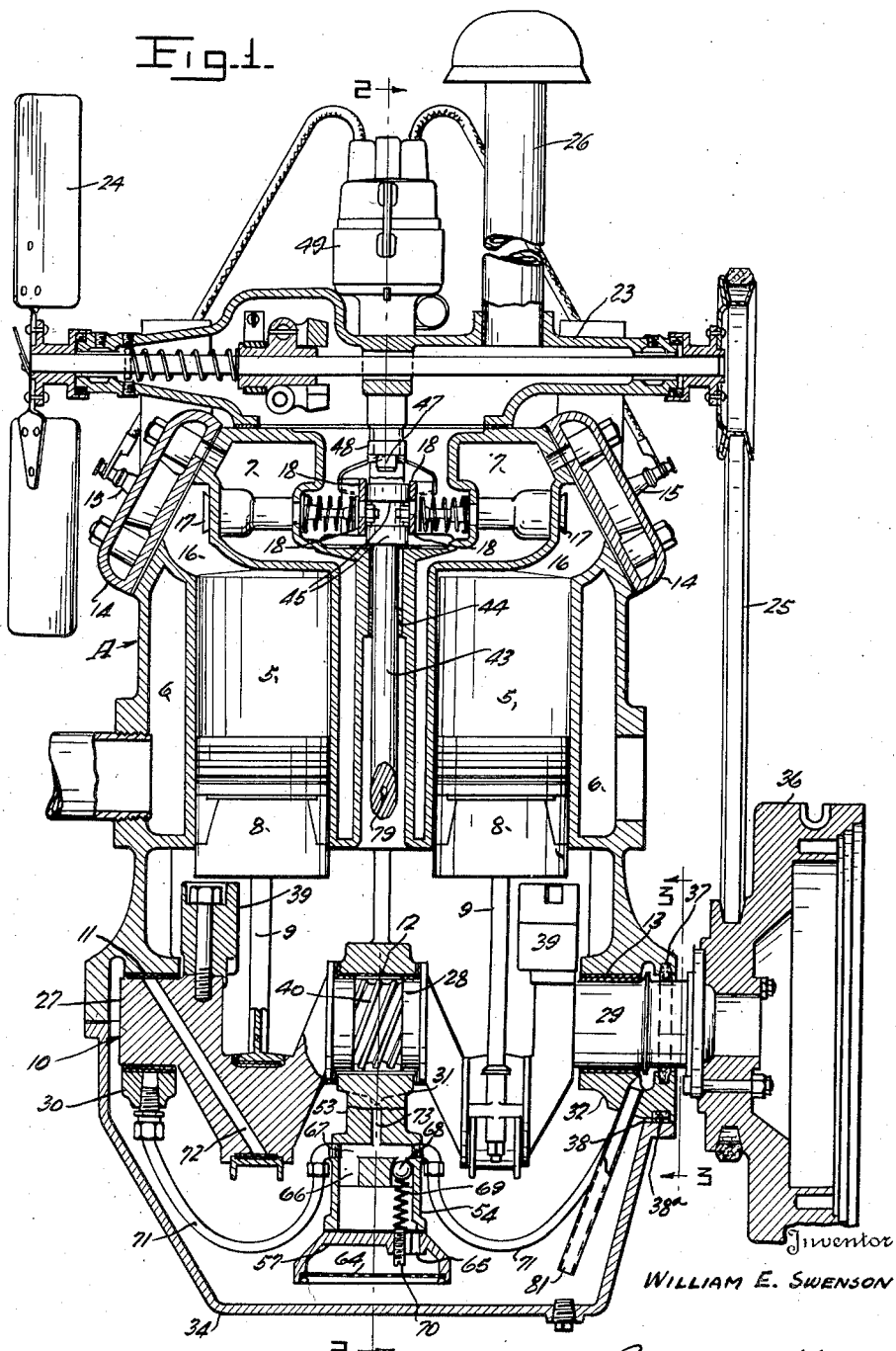
Fig. 1 is a vertical section taken through an engine embodying my improvements, taken along the line of the crankshaft and in a plane cutting the cylinders, but with certain of the parts shown in elevation.

It may be noted that this application is a division of my copending application Serial No. 221,064, filed July 25, 1938, for a Power plant, and reference is invited to this disclosure for comparative purposes.

Referring now with more particularity to the drawings, it will be seen that the devices forming the subject matter of the present invention are shown as embodied in a two cylinder engine, similar to that also disclosed in my copending application above identified, and which includes a cylinder block A formed with the cylinders 5, the surrounding water jackets 6 and the valve housings 7. These cylinders are provided with pistons 8 connected by connecting rods 9 to the cranks of the crankshaft 10 which is journaled at the bottom of the cylinder block in front, center, and rear bearings 11, 12, and 13. Cylinder heads 14 secured to the upper corner portions of the block A carry the spark plugs 15 for firing the mixture in the combustion chambers 16 defined within the heads, and the admission of fuel and exhaust of the burnt gases are controlled by valves 17 in the upper portion of the block. These valves are opened and closed by properly arranged levers 18 arranged to contact their inner ends, and the block A includes intake and exhaust manifolds 19 and 20 which connect the respective valves for each cylinder and which are in turn connected respectively to the carburetor 21 and exhaust pipe 22. Atop the block A, and forming a cover therefor, is mounted a housing 23 which supports a cooling fan 24 driven from the crankshaft by the belt 25, in the manner clearly shown, and the air intake or breather 26. The cooling liquid is circulated in the water jackets 6 in usual manner from a radiator (not shown).

These parts are all described in detail in my copending application, and reference may be had thereto for a more complete discussion of the operation and advantages of the arrangement shown. The present invention being confined to other features, will now be completely described.

The crankshaft has the spaced journals 27, 28, and 29 supported in the bearings 11, 12, and 13, respectively, and which are retained in place by the downwardly removable bearing caps 30, 31, and 32. A crank case cover or oil pan 34, also downwardly removable, is secured beneath the block A by screws 35, and it will be noted that the frontal bearing 11, journal 27, and cap 30, are all located entirely within the confines of the pan. The rear end of the crankshaft however, extends rearwardly from the engine for connection to the flywheel 36 (and to the driven member whatever it may be), and therefore the rear bearing is provided with an oil sealing ring 37. The rear bearing cap 33 rests in a generally semi-circular recess 38 in the rear of the pan 34 and upon a similarly shaped gasket 38a as shown. It is obvious, however, that the seal 37 is the only "running" seal, or the only one subject to frictional wear in the assembly, and the problem of keeping the crankcase sealed against the escape of oil or ingress of foreign matter is thus greatly simplified. No moving parts are engaged with the other seal at 38a, and it will be readily evident that the oil pan may be removed without disturbing the crankshaft supporting and sealing elements in any way.

Inasmuch as the cranks are both offset to the same side of the crankshaft in the particular engine shown, weight blocks 39 are provided and secured adjacent front and rear bearings to properly counterbalance the assembly.

The center journal 28 of the crankshaft is milled and cut to provide teeth for a drive gear 40, and the center bearing cap 31 is recessed out at 41 to receive a driven gear or pinion 42 which is thus supported in mesh with the drive gear and adapted to be rotated about a generally upright axis as the crankshaft 10 is turned. An elongated drive shaft or cam shaft 43 has this driven gear 42 secured to its lower end and the shaft is journaled in bearing bushings 44 upwardly between the cylinders 5 and between the valve operating levers 18. The shaft 43 thus necessarily inclines somewhat from the vertical in order to carry the offset gear at its lower end, as clearly shown in Fig. 2, and rotation of this shaft will of course occur as the crankshaft operates.

The shaft 43 carries removably mounted cams 45 at its upper end for operating the levers 18, and in turn actuating valves 17 in the proper sequence with respect to operation of the pistons 8 and crankshaft 10 and additionally the upper end of the shaft is notched at 46 to form a releasable driving connection with a jaw 47 on the drive shaft 48 of the distributor 49. This distributor, of conventional interior arrangement, is releasably retained in an opening 50 in the housing 23 by a set screw 51, and when removed is readily releasable from its connection with the notches 46.

The center bearing cap 31 is retained in place by downwardly removable cap screws 52 and has an integral depended extension 53 in alignment with the axis of the shaft 43. At its lower end this extension is enlarged, recessed, and flared out to provide an oil pump housing 54 in which the meshed oil pumping gears 55 and 56 are fitted and in which they are retained by the removable bottom or closure plate 57. A bore 58 extends from the recess 41 downwardly into the oil pump housing, and a pump shaft 59 is journaled therethrough with rigid connection at 60 to one pump gear 55. A key or jaw 61 formed on the lower end of the shaft 43 releasably engages a notch 62 in the upper end of the pump shaft 59 to thereby rotate said pump shaft and actuate the pump gears. The idler gear 56 is journaled by a short stub shaft 63 in the oil pump housing as shown. Oil from the oil pan 34 enters the pump through a filter screen 64, supported in a marginal flange of closure plate 57, and flows into the pump housing at the port 65. The oil is then ejected under pressure, by well known action of the gears, through the outlet port 66 into a cross chamber 67 in the housing. Excess pressure in this chamber, or in any part of the lubricating system communicating therewith, is relieved by a ball check valve 68 to flow back to the intake side of the pump. The pressure required to thus affect the valve may be adjusted by varying the tension of the spring 69 through action of the screw 70.

Oil is carried to the end bearings 11 and 13 by tubes 71 leading from the cross chamber 67 to said bearings, and diagonally extended passages cut in the crankshaft, one of which is shown at 72, lead the oil to the connecting rod bearings. Oil is carried to the center bearing 12 by a duct 73 leading upwardly from the chamber 67 and this oil further lubricates the gears 40 and 42 and flows from the recess 41 into passages 74 and 75 from one of which a line 76 leads to the usual oil pressure gauge (not shown). The oil also enters through ports 77 and 78 into an axially extended bore or passageway 79 in the shaft 43 and flows upwardly therethrough to finally be discharged by centrifugal force at the upper end of the shaft and thereby bathe the valves and working parts thereat with a fine lubricating spray. The injection of oil into the bore 79 takes place once each revolution as ports 77 and 78 come into registry, and control of the amount of oil thus injected may be had by proper selection of the size of at least one of the ports. The oil returns to the crankcase through the opening 80 (Fig. 2) at the upper part of the cylinder block. Excess oil from the bearing 13 returns through pipe 81.

It will be evident that the entire oil pump assembly may be removed simply by removing the cap screws 52 and disconnecting the oil lines 71, and when the pump is removed the shaft 43 may be withdrawn in a downward direction. All of these operations may be performed without disturbing the crankshaft seal and support or other parts of the engine. The single seal 37 as stated is the only oil seal required and in furtherance of this object of preventing escape of oil, the oil level measuring bayonet or rod 82 is mounted through a tube 83 downwardly through the block A at a point substantially above and clear of the oil pan 34.

Attention is directed to the small clearance space at 84 between the distributor and upper end of the shaft 43 as best shown in Fig. 2. It is through this space that the lubricating oil is discharged for lubricating the valve operating parts at the upper portion of the engine.

It is thought that further details as to the operation of the engine will be understood, and it will be readily evident that the engine may be built up in extremely simple and compact form in accordance with this invention. Servicing of the working parts is very convenient and, due to the direct drive from the crankshaft to the shaft 43 without intervening gears, chains, or belts, the proper timing of ignition and valve operation by the shaft will be readily secured. The lubricating system furthermore provides adequate lubrication to all working parts under positive pressure at all times.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. An engine assembly including a power actuated crankshaft, a gear on the crankshaft, a drive shaft journaled adjacent the crankshaft, a pinion on the drive shaft meshed with the said gear, intake and exhaust valves, means on the drive shaft for actuating the said valves, and an ignition distributor and engine lubricating oil pump connected to the ends of the drive shaft for operation thereby.

2. The combination, with an internal combustion engine, of means for operating the valves, distributor and oil pump of the engine from its crankshaft, the same comprising a drive shaft having valve operating cams and drive connection at opposite ends with the distributor and oil pump, a gear on the said shaft arranged adjacent one journal of the crankshaft, and this journal of the crankshaft having gear teeth cut in its periphery for driving engagement with the said gear on the drive shaft.

3. The combination with an internal combustion engine including spaced upright cylinders and a crankshaft supported therebeneath, of means for actuating the valves, ignition distributor and oil pump of the engine, the said means comprising a drive shaft journaled and supported in upright position between the cylinders and extending transversely with respect to the axis of one journal of the crankshaft, operating means on the drive shaft for operating the said valves, distributor and oil pump, a gear on the drive shaft arranged alongside the said journal of the crankshaft, and gear teeth formed on this journal for driving the said gear and drive shaft.

4. A vertical engine comprising spaced cylinders, a crankshaft extending beneath the cylinders and including a center journal located in a plane vertically below the space between the cylinders, gear teeth formed on this center journal, a drive shaft supported in an upright plane in the space between the cylinders and extending tangentially at its lower end with respect to the crankshaft, a gear on the drive shaft meshing with the toothed journal of the crankshaft, valves arranged above the cylinders, cams on the upper end portion of the drive shaft for actuating the valves, a distributor connected to the upper end of the drive shaft, and an oil pump supported below the crankshaft and connected to the lower end of the crankshaft.

5. An internal combustion engine, including spaced cylinders, a crankshaft arranged below the cylinders, bearings supporting the crankshaft, a drive shaft supported between the cylinders, means on the drive shaft for actuating the valve, distributor and oil pump elements of the engine, gears connecting the crankshaft and drive shaft for driving the latter, and one crankshaft bearing being constructed and arranged to act as a bearing and housing for the said gears.

6. The combination with an internal combustion engine including a power actuated crankshaft and a supporting bearing therefor, of means for actuating certain auxiliary elements of the engine comprising a drive shaft connected to said elements and journaled through the bearing transversely with respect to the crankshaft, gears on the drive shaft and crankshaft forming a driving connection between the two, and the said crankshaft bearing having a recess for receiving and supporting the said gears in meshing engagement.

7. An internal combustion engine including a power actuated crankshaft, bearings supporting the crankshaft upon its spaced journals, a drive shaft for certain component parts of the engine, the said shaft being supported adjacent the crankshaft, one of the said journals of the crankshaft having gear teeth in its bearing surface, a gear on the drive shaft and meshed with the said gear teeth, and the bearing for this journal having communicating recesses forming bearings for the journal and the gears.

8. An internal combustion engine including a crankshaft, bearings supporting the crankshaft, a drive shaft journaled through one bearing, gears on the crankshaft and drive shaft for actuating the latter, one bearing having bearing means for the drive shaft and including an extension member having a chamber formed therein, oil pumping gears arranged in the chamber, and a driving connection between the gears and the said drive shaft.

9. An internal combustion engine including a crankshaft, bearings supporting the crankshaft and including removable bearing caps, an oil pump housing integrally formed on one bearing cap, oil pumping mechanism in said housing and drive means connected to the oil pumping mechanism and having driving connection with the crankshaft.

10. An internal combustion engine including a crankshaft, a bearing for the crankshaft and including a removable bearing cap, the said cap having a chambered integral extension, oil pumping gears in the said extension, a driving connection between the crankshaft and one gear, oil inlet means leading to the pumping gears, and oil discharge means leading from the pumping gears through the said bearing cap extension to the bearing for lubricating the same.

11. An internal combustion engine including a crankshaft, a bearing supporting the crankshaft and including a removable bearing cap, the said bearing having a recess communicating with the crankshaft, a gear journaled in this recess alongside the crankshaft, gear teeth formed on the crankshaft and meshing with the said gear, an extension member formed on the bearing cap, an oil pump on said extension member, oil inlet and outlet means for the oil pump, and the said outlet means communicating with the recess in the bearing for lubricating the crankshaft and gears.

12. An internal combustion engine including valve actuating mechanism and a crankshaft, a drive shaft having a driving connection at its lower portion with the crankshaft and extended upwardly adjacent the valve mechanism, cams on the drive shaft for actuating said valve mechanism, the said drive shaft having a longitudinally extending oil passageway opening through its upper end, and means for supplying oil under pressure to the passageway and discharging the oil at the upper end thereof over the valve mechanism for lubricating the same.

13. An internal combustion engine including a cylinder block having cylinders therein and valve mechanism arranged above the cylinders, a crankshaft journaled below the block, a cover member mounted below the block and defining a crankcase portion, an upright valve actuating shaft extending alongside the crankshaft and operatively connected thereto for rotation thereby, the said shaft having an oil passageway leading upwardly therethrough and opening at the upper end adjacent the said valve mechanism, oil moving means for supplying oil under pressure to the passageway and ejecting said oil from the upper end thereof over the valve mechanism, and means for returning surplus oil from the upper part of the block to the oil moving means for recirculation thereby.

WILLIAM E. SWENSON.

CERTIFICATE OF CORRECTION.

Patent No. 2,226,596. December 31, 1940.

WILLIAM E. SWENSON.

It is hereby certified that the above numbered patent was erroneously issued to the inventor, said "SWENSON" whereas said patent should have been issued to Minneapolis-Moline Power Implement Company, of Minneapolis, Minnesota, a corporation of Delaware, as assignee, as shown by the record of assignments in this office; in the heading to the printed specification, line 4, for "Application March 27, 1939, Serial No. 264,427" read --Original application July 25, 1938, Serial No. 221,064, now Patent No. 2,226,595, dated December 31, 1940. Divided and this application March 27, 1939, Serial No. 264,427--; page 1, first column, line 1, before the words "This invention" insert the following paragraph -

This application is a division of application Serial No. 221,064, filed July 25, 1938, now Patent No. 2,226,595, dated December 31, 1940. ;

and in the heading to the drawings, Sheets 1 and 2, for "Filed March 27, 1939" read --Original filed July 25, 1938--; and that the said Letters Patent should be read with this correction therein that the same may conform to the record of the case in the Patent Office.

Signed and sealed this 4th day of March, A. D. 1941.

(Seal)
               Henry Van Arsdale,
             Acting Commissioner of Patents.